United States Patent
Chan et al.

(10) Patent No.: US 9,348,603 B2
(45) Date of Patent: May 24, 2016

(54) ELECTRONIC APPARATUS AND BOOTING METHOD

(71) Applicants: Chong-Kim Chan, Taipei (TW); Yu-Guang Chen, Taipei (TW)

(72) Inventors: Chong-Kim Chan, Taipei (TW); Yu-Guang Chen, Taipei (TW)

(73) Assignee: ASROCK INC., Taipei (TW)

( * ) Notice: Subject to any disclaimer, the term of this patent is extended or adjusted under 35 U.S.C. 154(b) by 416 days.

(21) Appl. No.: 13/762,065

(22) Filed: Feb. 7, 2013

(65) Prior Publication Data
US 2013/0262848 A1 Oct. 3, 2013

(30) Foreign Application Priority Data
Mar. 27, 2012 (TW) .............................. 101110615 A

(51) Int. Cl.
*G06F 9/44* (2006.01)
*G06F 9/445* (2006.01)

(52) U.S. Cl.
CPC ................ *G06F 9/4401* (2013.01); *G06F 8/65* (2013.01)

(58) Field of Classification Search
CPC .............. G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | |
|---|---|---|---|
| 2007/0038801 A1* | 2/2007 | Tanaka ......................... | 711/103 |
| 2007/0113065 A1* | 5/2007 | Lee et al. ........................ | 713/1 |
| 2007/0219666 A1* | 9/2007 | Filippov et al. ............... | 700/245 |
| 2009/0094450 A1 | 4/2009 | Krzyzanowski et al. | |
| 2010/0180108 A1* | 7/2010 | Liu .................................. | 713/2 |
| 2012/0117607 A1* | 5/2012 | Li .................................. | 725/132 |

FOREIGN PATENT DOCUMENTS

| | | |
|---|---|---|
| TW | 200713037 | 4/2007 |
| TW | 201035868 | 10/2010 |
| WO | 03025742 | 3/2003 |

OTHER PUBLICATIONS

"Search Report of European Counterpart Application", issued on Jun. 17, 2013, p. 1-p. 8, in whcih the listed references were cited.

* cited by examiner

*Primary Examiner* — Thomas Lee
*Assistant Examiner* — Mohammad A Rahman
(74) *Attorney, Agent, or Firm* — J.C. Patents

(57) ABSTRACT

An electronic apparatus and a booting method are provided. The electronic apparatus comprises a processing unit, a firmware unit and a memory. In the booting method, a boot code is read from the firmware unit by the processing unit for executing a booting initialization procedure. Whether a new version firmware code exists in a first block of the memory is determined by the boot code. If the new version firmware code exists in the first block, the new version firmware code is loaded into a second block of the memory by the boot code, and the new version firmware code is read from the second block so as to execute a booting procedure for loading an operating system.

11 Claims, 3 Drawing Sheets

ELECTRONIC APPARATUS AND BOOTING METHOD

CROSS-REFERENCE TO RELATED APPLICATION

This application claims the priority benefit of Taiwan application serial no. 101110615, filed on Mar. 27, 2012. The entirety of the above-mentioned patent application is hereby incorporated by reference herein and made a part of this specification.

BACKGROUND OF THE INVENTION

1. Field of the Invention

The disclosure relates to a booting method, and more particularly to an electronic apparatus and a booting method, by which a new version firmware code is used for booting without having to update a firmware unit in advance.

2. Description of Related Art

After a user presses a power button, a computer system can only be activated in normal after going through a series of hardware initialization until no error is detected. Specifically, after the power of the computer system is turned on, a basic input/output system (hereafter BIOS) is loaded into a memory and starts to execute a power on self test (POST) procedure to perform initialization and detection to hardware devices of the computer system so as to ensure that these hardware devices are able to work in normal. Therefore, the BIOS plays an important role in the computer system.

Generally speaking, when the BIOS is updated, a new version BIOS is programmed into a BIOS chip so the new version BIOS can be used for booting. Thus, if the power failure emerges during the programming process, the computer system will fail to boot. Or, if the new version BIOS is incompatible with a current hardware, it may cause the system to be unstable or to fail to boot.

SUMMARY OF THE INVENTION

The disclosure provides an electronic apparatus and a booting method, by which a new version firmware code is used for booting without having to program a firmware code into a firmware unit in advance.

The disclosure provides an electronic apparatus, including a memory, a firmware unit, and a processing unit. In the disclosure, the memory includes a first block and a second block. A boot code and an original firmware code are stored in the firmware unit. The processing unit is coupled to the memory and firmware unit. When the electronic apparatus boots, the boot code is read by the processing unit for executing a booting initialization procedure; whether a new version firmware code exists in the first block is determined by the boot code. If the new version firmware code exists in the first block, the new version firmware code is loaded into the second block by the boot code, and the new version firmware code is read from the second block so as to execute the booting procedure for loading the operating system. If the new version firmware code does not exist in the first block, the original firmware code in the firmware unit is loaded into the second block of the memory by the boot code, and the original firmware code is read from the second block so as to execute the booting procedure for loading the operating system.

The disclosure provides a booting method adaptable for an electronic apparatus. The electronic apparatus includes a processing unit, a firmware unit, and a memory, wherein a boot code and an original firmware code are stored in the firmware unit. In the disclosure, the boot code in the firmware unit is read for executing a booting initialization procedure; moreover, whether a new version firmware code exists in a first block is determined by the boot code. If the new version firmware code exists in the first block, the new version firmware code is loaded into a second block of the memory by the boot code. In addition, the new version firmware code is read from the second block so as to execute a booting procedure for loading the operating system.

In an embodiment of the disclosure, in the step of executing the boot code in the firmware unit, whether a system setting data exists in a setting value storing region is determined by the boot code. If the system setting data does not exist, then a booting initialization procedure is executed so that a system setting value is obtained and recorded into the setting value storing region. If the system setting data exists, the system setting data is directly loaded.

In an embodiment of the disclosure, in the step of executing the booting initialization procedure, a bootstrap processor (BSP) is initialized and a memory test is executed to the memory.

In an embodiment of the disclosure, at the time of executing the memory test to the memory, when the first block is detected, content in the first block is copied to another block of the memory. After the detection of the first block is completed, the aforementioned content is then written back to the first block.

In an embodiment of the disclosure, after the step of determining whether the new version firmware code exists in first block of the memory by the boot code, if the new version firmware code does not exist in the first block, the original firmware code in the firmware unit is loaded into the second block of the memory by the boot code. Meanwhile, the original firmware code is read from the second block so as to execute the booting procedure for loading the operating system.

In an embodiment of the disclosure, in the step of executing the booting procedure, when a command of loading a new firmware is received, the new version firmware code is loaded into the first block and the system reboots from a storing unit.

Based on the aforementioned, in the disclosure, the new version firmware is loaded into the memory so that the new version firmware code in the memory is used for booting. Therefore, the new version firmware code may be used for booting without having to program the firmware code into the firmware unit in advance.

In order to make the aforementioned features and advantages of the disclosure more comprehensible, embodiments accompanying figures are described in detail below.

DESCRIPTION OF EMBODIMENTS

Conventionally, when a system firmware is updated, the firmware is programmed into a firmware unit, and then the system reboots. If the new version firmware is incompatible with a current hardware, it may cause the system to be unstable or to fail to boot. To solve the problem, the disclosure provides an electrical apparatus and a booting method so that a user can boot by using the new version firmware code without having to program the new version firmware code in advance. In order to make the content of the disclosure more comprehensible, the following embodiments are provided as examples based on which the disclosure may be practically implemented.

The First Embodiment

Figure 1:
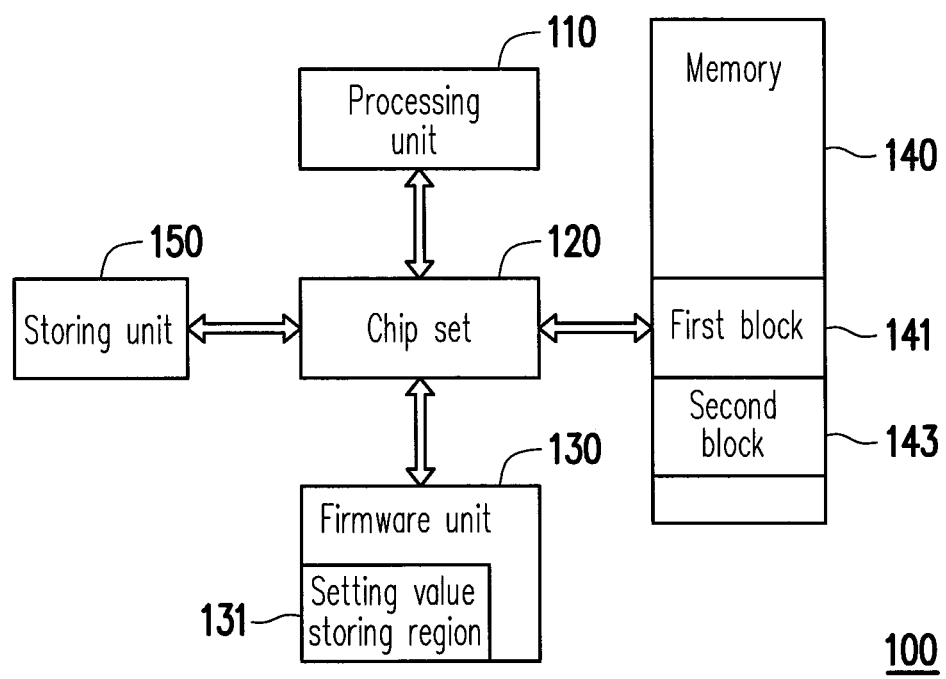
FIG. 1 is a block diagram of an electronic apparatus according to a first embodiment of the disclosure.

FIG. 1 is a block diagram of an electronic apparatus according to a first embodiment of the disclosure. Please refer to FIG. 1. An electronic apparatus 100 includes a processing unit 110, a chip set 120, a firmware unit 130, a memory 140, and a storing unit 150. In the embodiment, the processing unit 110 is, for example, a central processing unit (CPU). The processing unit 110 is coupled to the firmware unit 130, the memory 140, and the storing unit 150 via the chip set 120. Meanwhile, the electronic apparatus 100 is, for example, a personal computer, a notebook computer, a tablet PC, and etc.

The processing unit 110 executes hardware as well as a firmware in the electronic apparatus 100 and processes data in software. The chip set 120 is a bridge by which the processing unit 110 exchanges information with the exterior. In the embodiment, the chip set 120 includes a Northbridge chip and a Southbridge chip. In other embodiments, the chip set 120 is, for example, a Southbridge chip, and the Northbridge chip may be integrated to the processing unit 110.

The firmware unit 130 stores a firmware. For example, the firmware unit 130 is a read only memory (ROM) or a flash memory, and the firmware is a basic input or output system (BIOS), an extensible firmware interface (EFI) BIOS, a unified extensible firmware interface (UEFI) BIOS, and etc.

In the embodiment, the firmware in the firmware unit 130 includes a boot code and an original firmware code. Moreover, the firmware unit 130 further includes a setting value storing region 131 for storing system setting data. The system setting data includes a memory setting value, a CPU setting value, a chip set setting value, and etc. However, in other embodiments, the setting value storing region 131 may be another independent readable and writable complementary metal-oxide-semiconductor (CMOS) random-access memory (RAM) chip.

The memory 140 is, for example, a random access memory (RAM). In the embodiment, a driving program (driver) and an operating system of all the components in the electronic apparatus 100 are loaded into the memory 140 for the processing unit 110 to read. For example, after the booting initialization procedure, the boot code and the original firmware code in the firmware unit 130 are loaded into the memory 140 through a manner of shadow RAM for the processing unit 110 to access. In the embodiment, the booting initialization procedure includes initializing a bootstrap processor (BSP), a memory test, and etc.

In the embodiment, a first block 141 is disposed in the memory 140 so as for another firmware code to be loaded into the first block 141. For example, a new version firmware code exists in the storing unit 150, and the new version firmware code is loaded into the first block 141 so that the booting procedure is performed via the new version firmware code in the first block 141. In addition, the memory 140 further includes a second block 143. The second block 143 is an execution space into which the firmware code in the firmware unit 130 is loaded upon completion of setting the processing unit 110 and the memory 140. In the embodiment, the storing unit 150 is, for example, a hard disk, a compact disc, a flash drive, and etc.

Figure 2:
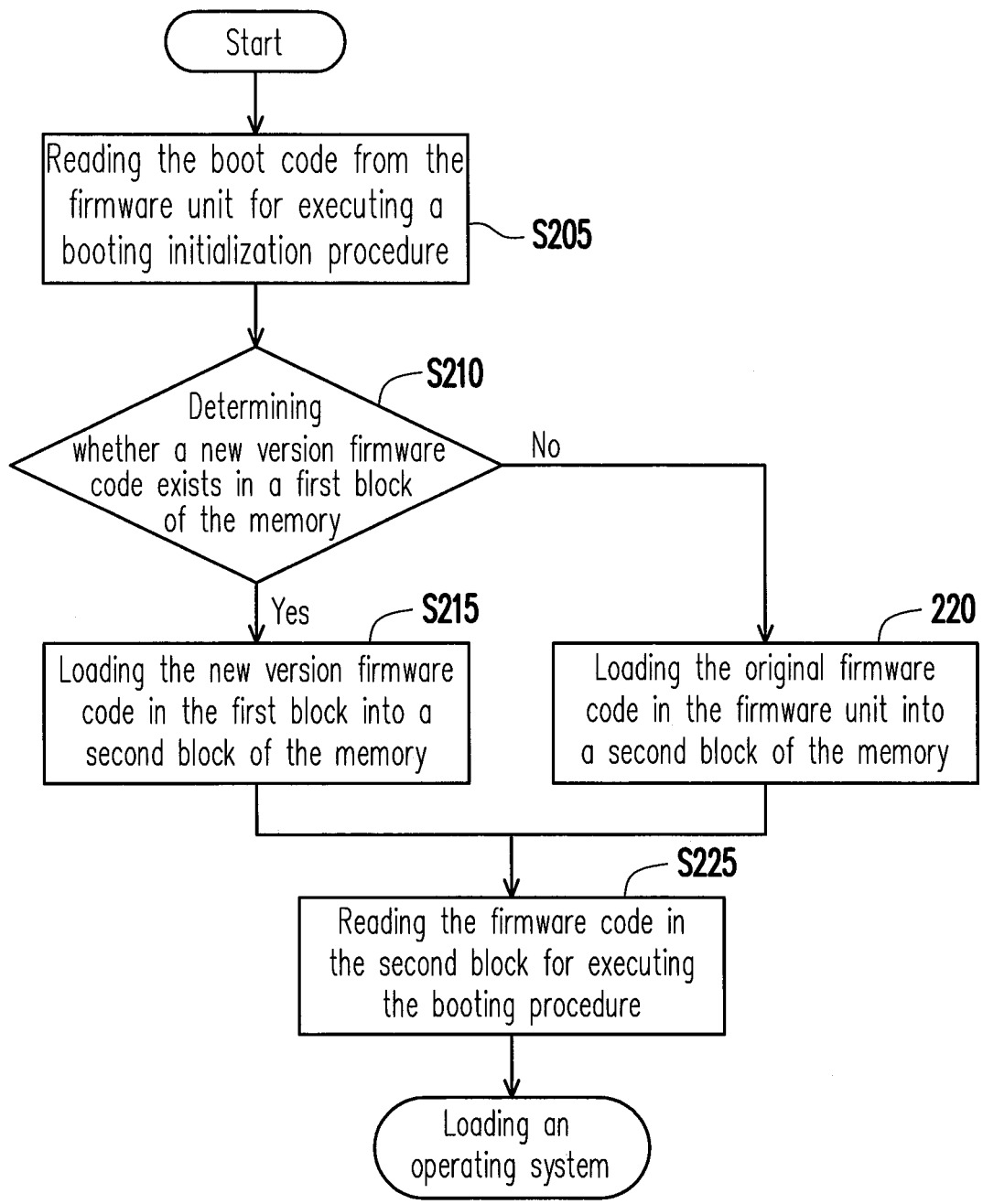
FIG. 2 is a flowchart of a booting method according to the first embodiment of the disclosure.

The electronic apparatus 100 is used in the following paragraphs for describing each step in a booting method. FIG. 2 is a flowchart of a booting method according to the first embodiment of the disclosure. Please refer to both FIGS. 1 and 2. When the electronic apparatus 100 boots, for example, the user presses a power button, in step S205, the processing unit 110 reads the boot code from the firmware unit 130 for executing the booting initialization procedure, for example, initializing the BSP and executing the memory test to the memory 140.

When the memory test is executed to the memory 140, to ensure that the content in the first block 141 will not be damaged, when the first block 141 is detected, the content in the first block 141 is copied to another block (whichever undetected block) of the memory 140, then the content is written back to the first block 141 upon completion of detecting the first block 141.

Subsequently, in step S210, whether the new version firmware code exists in the first block 141 of the memory 140 is determined by the boot code. If the new version firmware code exists in the first block 141, then step S215 is executed, in which the new version firmware code is loaded into the second block 143 by the boot code. On the other hand, if the new version firmware code does not exist in the first block 141, then step S220 is executed, in which the original firmware code in the firmware unit 130 is loaded into the second block 143 of the memory 140 by the boot code.

Thereafter, in step S225, a firmware code is read from the second block 143 for executing the booting procedure so that an operating system may be loaded. That is to say, if the new version firmware code exists in the first block 141, then the new version firmware code is loaded into the second block 143 so that the new version firmware code is read from the second block 143 for executing the booting procedure. Besides, if the new version firmware code does not exist in the first block 141, then the original firmware code is loaded into the second block 143 from the firmware unit 130 so that the original firmware code is read from the second block 143 for executing the booting procedure.

Therefore, the new version firmware code is loaded into the first block 141 for execution, thereby skipping the action of directly updating the new version firmware code into the firmware unit 130, and further avoiding unsuccessful programming or unsuccessful booting result from that new version firmware code is incompatible with the current hardware.

The Second Embodiment

Figure 3:
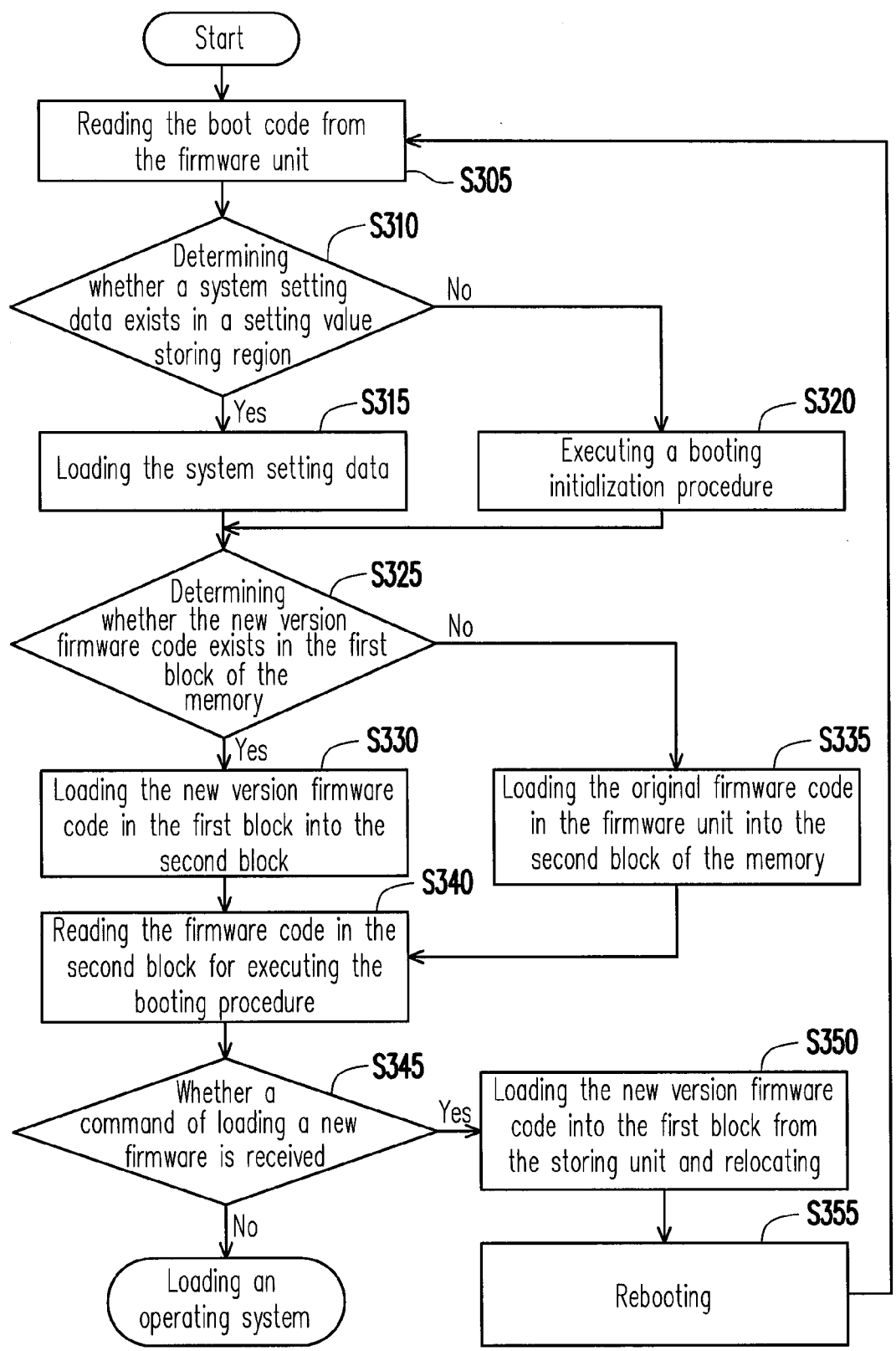
FIG. 3 is a flowchart of a booting method according to a second embodiment of the disclosure.

FIG. 3 is a flowchart of a booting method according to a second embodiment of the disclosure. Please refer to both FIGS. 1 and 3. When the electronic apparatus 100 boots, in step S305, the boot code is read from the firmware unit 130 by the processing unit 110.

Subsequently, in step S310, whether a system setting data exists in a setting value storing region 131 is determined by the boot code. If the system setting data does not exist, then step S320 is executed for executing a booting initialization procedure so that the system setting value is obtained and recorded into the setting value storing region 131. In reverse, if the system setting data already exists, then step S315 is executed, and the system setting data is directly loaded.

For example, in the first cold boot, the system setting data does not exist in the setting value storing region 131. That is to say, after the hardware is reset, all the devices (including the memory 140) are not initialized yet and therefore cannot be used. Accordingly, in step S320, the booting initialization procedure is executed, including initializing the BSP, executing the memory test to the memory 140, initializing the chip set 120, and so on. After executing the booting initialization procedure, the obtained system setting value such as memory setting value (including the size, timing, voltage, frequency, and so on of the memory 140), processing unit setting value (including register setting and voltage of the processing unit 110), chip set setting value (including the register setting and voltage of the chip set 120), or the setting value of a memory controller and etc. is recorded in the setting value storing region 131.

After executing the booting initialization procedure once, if warm boot is executed and the system reboots, after the boot code is read from the firmware unit 130, in step S310, it will be detected that the system setting data already exists in the setting value storing region 131, and therefore step S315 will be executed to load the system setting data directly.

Thereafter, in step S325, whether the new version firmware code exists in the first block 141 of the memory 140 is determined by the boot code. If the new version firmware code exists, then step S330 is executed, in which the new version firmware code in the first block 141 is loaded into the second block 143 by the boot code. If the new version firmware code does not exist, then step S335 is executed, in which the original firmware code of the firmware unit 130 is loaded into the second block 143 by the boot code. Then, in step S340, the firmware code is read from the second block 143 by the processing unit 110 for executing the booting procedure.

Before loading the operating system, in step S345, whether a command of loading the new firmware is received is determined. For example, a set of hot keys may be disposed in the keyboard for the user to decide whether to load the new version firmware or not. When the command of loading the new firmware is received, in step S350, the new version firmware code is loaded into the first block 141 from the storing unit 150. For example, when the command of loading the new firmware is received, the storing unit 150 or other storing media are scanned to see if the new version firmware code exists so as to load the new version firmware code into the first block 141 of the memory 140. Moreover, the new version firmware code in the first block 141 is relocated so that the new version firmware code in the first block 141 may be read accurately. In the embodiment, the electronic apparatus 100 supports the file system of each type of storing media in the firmware execution stage. Accordingly, the new version firmware code may be loaded into the memory 140 from any storing media.

Additionally, in other embodiments, a parameter may be directly set in the firmware unit 130 so that step S350 can be executed right after step S340, and the new version firmware code in the storing unit 150 is directly and automatically loaded into the first block 141 and relocated.

Subsequently, in step S355, the system reboots, and step S305 is executed again. If the command of loading the new firmware is not received, for example, if it is set that the command of loading the new firmware is not received within two seconds, then the operating system is directly loaded.

Suppose this is the first cold boot, and the new version firmware code is yet to be loaded into the first block 141, in this case the processing unit 110 will execute steps S305, S310, S320, S325, S335, and S340. Thereafter, suppose the firmware is to be updated, and then step S350 will be executed. After rebooting, the new version firmware code will exist in the first block 141 and the system setting data will exist in the setting value storing region 131. Then the processing unit 110 will execute steps S305, S310, S315, S325, S330, and step S340. In this case, the booting procedure is executed by the new version firmware code. Furthermore, the user can decide whether to continue to load other new version firmware codes or not, as shown in step S345. If the user would like to load other new version firmware codes, then steps S350-S355 are executed and steps S305-340 are resumed after the command of loading the new firmware is received.

In addition, if the new version firmware code is abnormal (for example, the version does not match, not supported by other hardware, and etc.), causing unsuccessful booting, then the electronic apparatus 100 can be shut down directly. After the computer is shut down, the new version firmware code in the first block 141 will be removed. Then, the computer reboots (cold boot). Steps S305-S325, S335, and S340 are executed, in which the previous original firmware code in the firmware unit 130 may still be used for performing booting. Since the user already knows that the to-be-updated new version firmware code is abnormal, before the new version firmware code is changed, the user may just not to give a command of loading the new firmware (for example, not to press the hot key). Alternatively, the abnormal new version firmware code in the storing unit 150 (embedded) can be removed, or the external storing unit 150 such as a flash drive can be removed directly.

To sum up, in the aforementioned embodiments, it is added that the firmware code has a capability to execute in the memory. In the meantime, the memory detecting procedure is revised so as to avoid damage to the firmware code of the first block in the memory. Therefore, it is unnecessary to program the firmware code into the firmware unit. Instead, the new version firmware code is loaded into the first block of the memory so that the new version firmware code in the first block of the memory is used for booting. In e system setting value of the processing unit, memory, and chip set are stored in the setting value storing region so that the system setting value can be loaded quickly during warm boot.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A booting method, for an electronic apparatus comprising a processing unit, a firmware unit, and a random access memory, wherein a boot code and an original firmware code are stored in the firmware unit, comprising:
   reading the boot code from the firmware unit;
   after executing a booting initialization procedure once, if a warm boot is executed to reboot, loading the system setting data directly from a setting value storing region of the firmware unit;
   during the warm boot, determining whether a new version firmware code exists in a first block of the random access memory by the boot code;
   loading the new version firmware code into a second block of the random access memory by the boot code if the new version firmware code exists in the first block; and
   reading the new version firmware code from the second block for executing a booting procedure.

2. The booting method according to claim 1, wherein the step of executing the boot code of the firmware unit comprises:
   determining whether a system setting data exists in a setting value storing region by the boot code;

executing the booting initialization procedure and then obtaining as well as recording the system setting value into the setting value storing region if the system setting data does not exist; and loading the system setting data directly if the system setting data already exists.

3. The booting method according to claim 2, wherein the setting value storing region is disposed in the firmware unit.

4. The booting method according to claim 1, wherein the step of executing the booting initialization procedure comprises:

initializing a bootstrap processor; and executing a memory test to the random access memory.

5. The booting method according to claim 4, wherein the step of executing the memory test to the random access memory further comprises:

when the first block is detected, a content in the first block is copied to another block of the random access memory first and then written back to the first block upon completion of detecting the first block.

6. The booting method according to claim 1, wherein after the step of determining whether the new version firmware code exists in the first block of the random access memory by the boot code further comprises:

loading the original firmware code in the firmware unit into the second block of the random access memory by the boot code if the new version firmware code does not exist in the first block; and reading the original firmware code from the second block so as to execute the booting procedure for loading an operating system.

7. The booting method according to claim 1, wherein the step of executing the booting procedure further comprises:

when a command of loading a new firmware is received, loading the new version firmware code into the first block from a storing unit; and rebooting.

8. An electronic apparatus, comprising:

a random access memory, comprising a first block and a second block;

a firmware unit, comprising a boot code and an original firmware code; and a processing unit, coupled to the random access memory and the firmware unit, wherein when the electronic apparatus boots, the processing unit reads the boot code, wherein after executing a booting initialization procedure once, if a warm boot is executed to reboot, loading the system setting data directly from a setting value storing region of the firmware unit, and whether a new version firmware code exists in the first block is determined by the boot code during the warm boot; if the new version firmware code exists in the first block, the new version firmware code is loaded into the second block by the boot code, and the new version firmware code is read from the second block so as to execute a booting procedure for loading an operating system; if the new version firmware code does not exist in the first block, the original firmware code in the firmware unit is loaded into the second block of the random access memory by the boot code, and the original firmware code is read from the second block so as to execute the booting procedure for loading the operating system.

9. The electronic apparatus according to claim 8, wherein the processing unit determines whether a system setting data exists in a setting value storing region via the boot code; if the system setting data does not exist, then the booting initialization procedure is executed, and then the system setting value is obtained and recorded into the setting value storing region; if the system setting data already exists, then the system setting data is directly loaded.

10. The electronic apparatus according to claim 8, wherein the booting initialization procedure comprises initializing a bootstrap processor and executing a memory test to the random access memory; wherein at the time of executing the memory test to the random access memory, when the first block is detected, a content in the first block is copied to another block of the random access memory first and then written back to the first block upon completion of detecting the first block.

11. The electronic apparatus according to claim 8, wherein when the processing unit receives a command of loading a new firmware, the processing unit loads the new version firmware code into the first block from a storing unit and then reboots.

* * * * *